United States Patent
Barkan et al.

(10) Patent No.: US 12,412,058 B2
(45) Date of Patent: Sep. 9, 2025

(54) METHODS AND SYSTEMS FOR AVOIDANCE OF UNINTENDED INDICIA SCANNING

(71) Applicant: ZEBRA TECHNOLOGIES CORPORATION, Lincolnshire, IL (US)

(72) Inventors: Edward Barkan, Miller Place, NY (US); Mark Drzymala, Saint James, NY (US); Darran Michael Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 69 days.

(21) Appl. No.: 18/217,149

(22) Filed: Jun. 30, 2023

(65) Prior Publication Data

US 2025/0005310 A1    Jan. 2, 2025

(51) Int. Cl.
*G06K 7/14*    (2006.01)
(52) U.S. Cl.
CPC ......... *G06K 7/1456* (2013.01); *G06K 7/1443* (2013.01)
(58) Field of Classification Search
None
See application file for complete search history.

(56) References Cited

U.S. PATENT DOCUMENTS

| | | | |
|---|---|---|---|
| 10,108,880 B2 * | 10/2018 | Johnson | G06Q 30/06 |
| 11,501,614 B2 * | 11/2022 | Wen | G07G 3/006 |
| 2016/0078300 A1 * | 3/2016 | Kundu | G06Q 20/208 |
| | | | 348/150 |
| 2021/0295078 A1 * | 9/2021 | Barkan | G06V 30/2247 |
| 2023/0034323 A1 * | 2/2023 | Laffargue | G06K 7/10722 |
| 2024/0289578 A1 * | 8/2024 | He | G06T 9/00 |

* cited by examiner

*Primary Examiner* — Thien M Le
*Assistant Examiner* — April A Taylor
(74) *Attorney, Agent, or Firm* — Yuri Astvatsaturov

(57) ABSTRACT

Methods and systems for avoidance of unintended indicia scanning are disclosed herein. An example system may include an imaging device comprising: (1) one or more image sensors; (2) a processing assembly communicatively coupled to the one or more image sensors and configured to: (i) instruct the one or more image sensors to capture the image data including a plurality of image frames over a FOV, (ii) decode an indicia in an initial image frame of the plurality of image frames to generate decoded indicia data of the indica, (iii) determine a first location associated with the indicia in the initial image frame, (iv) determine a second location associated with the indicia in a subsequent image frame, (v) determine whether a positional difference between the second location and the first location exceeds a threshold value, and (vi) transmit the decoded indicia data of the indicia to a host processor.

19 Claims, 9 Drawing Sheets

METHODS AND SYSTEMS FOR AVOIDANCE OF UNINTENDED INDICIA SCANNING

BACKGROUND

As quality and precision improve, imagers scan objects faster and more accurately, which is particularly noticeable when scanning indicia and other features on objects. Further, the push toward utilizing high-definition imaging technology allows imagers to deploy a larger field of view capturing images over a greater expanse. However, such performance enhancements present new, unintended technical problems. When swiping an object over a field of view, an imager may now (and undesirably) capture multiple images of the same object, perform repeated indicia/object feature processing on each of those captured images each time offloading that imaging data to a host processor. The result is the generation of duplicative object images, increased demands on image processing, and bottlenecking of data buses between processors. There exists a need for systems that avoid unintended object scanning, in particular indicia and other feature scanning.

SUMMARY

In an embodiment, the present invention may be an imaging device comprising: (1) one or more image sensors that may collectively have a field of view (FOV) over which to capture image data and/or (2) a processing assembly communicatively coupled to the one or more image sensors. The processing assembly may be configured to: (i) instruct the one or more image sensors to capture the image data, wherein the image data may include a plurality of image frames over the FOV, (ii) decode an indicia in an initial image frame of the plurality of image frames to generate decoded indicia data of the indica, (iii) determine a first location associated with the indicia in the initial image frame, (iv) determine a second location associated with the indicia in a subsequent image frame, wherein the subsequent image frame is a predetermined number of image frames or a predetermined time interval after the initial image frame, (v) determine whether a positional difference between the second location and the first location exceeds a threshold value, and/or (vi) responsive to determining the positional difference exceeding the threshold value, transmit the decoded indicia data of the indicia to a host processor.

Additionally or alternatively, in some embodiments, the processing assembly may be further configured to, responsive to determining the positional difference does not exceed the threshold value, store the decoded indicia data in at least one of: (i) one or more registers of the processing assembly or (ii) one or more memories communicatively coupled to the processing assembly.

In some embodiments, the first location may correspond to a first set of coordinates in the first image frame, and/or the second location may correspond to a second set of coordinates in the second image frame. Additionally or alternatively, the first location may correspond to a first set of bounding boxes in the first image frame, and/or the second location may correspond to a second set of bounding boxes in the second image frame. Additionally or alternatively, the first location may correspond to a first centroid in the first image frame, and/or the second location may correspond to a second centroid in the second image frame.

Additionally or alternatively, in some embodiments, the processing assembly may be further configured to determine a direction of the indicia based upon the positional difference between the second location and the first location and/or responsive to determining the direction of the indicia being toward the center of the FOV, transmit the decoded indicia data of the indicia to the host processor. In some embodiments, the positional difference may be a collection of differences between individual point coordinates (e.g., p1 from the initial image frame may have coordinates x1y1 and p1' from the subsequent image frame may have coordinates x1'y1'), a difference in bounding boxes, a difference in centroid points, and/or the like. Additionally or alternatively, a two-dimensional direction may be inferred from the sign of the resulting difference (e.g., a negative result on the x-components of the coordinates may indicate that the indicia has a leftward direction across the FOV, a positive result on the y-components of the coordinates may indicate that the indicia has an upward direction across the FOV, etc.).

Additionally or alternatively, in some embodiments, the processing assembly may be further configured to determine an initial size of the indicia in the initial image frame based upon a pixel count of at least a portion of the indicia in the initial image frame, determine a subsequent size of the indicia in the subsequent image frame based upon a pixel count of at least the portion of the indicia in the subsequent image frame, and/or responsive to determining the subsequent size of at least the portion of the indicia to be greater than the initial size of at least the portion of the indicia, transmit the decoded indicia data of the indica to the host processor. In these embodiments, a third dimensional direction may be inferred by the resulting pixel counts (e.g., the indicia is moving towards one or more of the one or more image sensors if the pixel count of the subsequent image frame is larger than the pixel count of the initial image frame, etc.). In some other embodiments, this inference may be determined by taking the differences between the two sets of coordinates and determining the signs of each component coordinate. For example, if the differences between the x-components of the x1y1 coordinates—corresponding to the upper-left most point of the indicia—are negative, and the differences between the x-components of the x2y2 coordinates—corresponding to the upper-right most point of the indicia—are positive, then it may be inferred that the indicia moved towards one or more of the one or more image sensors.

Additionally or alternatively, in some embodiments, the FOV may include a set of sub-FOVs, wherein at least one sub-FOV of the set of sub-FOVs corresponds to a set of coordinates of image data relating to a periphery of the FOV. In these embodiments, the processing assembly may be further configured to determine whether the first location associated with the indicia is inside the at least one sub-FOV, determine whether the second location associated with the indicia is outside the at least one sub-FOV, and/or responsive to determining the first location associated with the indicia is inside the at least one sub-FOV and determining the second location associated with the indicia is outside the at least one sub-FOV, transmit the decoded indicia data of the indica to the host processor. Additionally or alternatively, the processing assembly may be further configured to determine whether the first location associated with the indicia is outside the at least one sub-FOV and/or responsive to determining the first location associated the indicia is outside the at least one sub-FOV, transmit the decoded indicia data of the indica to the host processor.

Additionally or alternatively, in some embodiments, the processing assembly may be further configured to generate a bounding box around the indicia based upon the first location and/or the second location, determine whether the orientation of the indicia exceeds a threshold angle relative to the center of the FOV based upon the bounding box of the indicia, and/or responsive to determining the orientation of the indicia exceeds a threshold angle relative to the center of the FOV, transmit the decoded indicia data of the indica to the host processor. For example, until the processing assembly determines the indicia has a threshold angle of 45 degrees in any direction pivoted toward one or more of the one or more image sensors, the processing assembly may withhold transmitting the decoded indicia data to the host processor.

Additionally or alternatively, in some embodiments, the processing assembly may be further configured to decode an another indicia in an intermediate image frame of the plurality of image frames to generate decoded indicia data of the another indica, wherein the intermediate image frame is a predetermined number of image frames or a predetermined time interval after the initial image frame, determine a third location associated with the another indicia in the intermediate image frame, wherein the third location corresponds to a third set of coordinates in the image data, determine a fourth location associated with the another indicia in an ensuing image frame, wherein the fourth location corresponds to a fourth set of coordinates in the image data and wherein the ensuing image frame is a predetermined number of image frames or a predetermined time interval after the intermediate image frame, and/or transmit the decoded indicia data of the another indicia to the host processor for analysis of the decoded indicia data of the another indicia based upon at least one of the third location or the fourth location.

In another embodiment, the present invention may be a computer-implemented method comprising: (1) capturing, by one or more image sensors that may collectively have a field of view (FOV), image data, wherein the image data may include a plurality of image frames over the FOV; (2) decoding, by a processing assembly communicatively coupled to the one or more image sensors, an indicia in an initial image frame of the plurality of image frames to generate decoded indicia data of the indica; (3) determining, by the processing assembly, a first location associated with the indicia in the initial image frame; (4) determining, by the processing assembly, a second location associated with the indicia in a subsequent image frame, wherein the subsequent image frame is a predetermined number of image frames or a predetermined time interval after the initial image frame; (5) determining, by the processing assembly, whether a positional difference between the second location and the first location exceeds a threshold value; and/or (6) responsive to determining the positional difference exceeding the threshold value, transmitting, by the processing assembly to a host processor, the decoded indicia data of the indicia.

Additionally or alternatively, in some embodiments, the computer-implemented method may further include, responsive to determining the positional difference does not exceed the threshold value, storing, by the processing assembly in at least one of: (i) one or more registers of the processing assembly or (ii) one or more memories communicatively coupled to the processing assembly, the decoded indicia data.

In some embodiments, the first location may correspond to a first set of coordinates in the first image frame, and/or the second location may correspond to a second set of coordinates in the second image frame. Additionally or alternatively, the first location may correspond to a first set of bounding boxes in the first image frame, and/or the second location may correspond to a second set of bounding boxes in the second image frame. Additionally or alternatively, the first location may correspond to a first centroid in the first image frame, and/or the second location may correspond to a second centroid in the second image frame.

Additionally or alternatively, in some embodiments, the computer-implemented method may further include determining, by the processing assembly, a direction of the indicia based upon the positional difference between the second location and the first location and/or responsive to determining the direction of the indicia being toward the center of the FOV, transmitting, by the processing assembly to the host processor, the decoded indicia data of the indicia. In some embodiments, the positional difference may be a collection of differences between individual point coordinates (e.g., p1 from the initial image frame may have coordinates x1y1 and p1' from the subsequent image frame may have coordinates x1'y1'), a difference in bounding boxes, a difference in centroid points, and/or the like. Additionally or alternatively, a two-dimensional direction may be inferred from the sign of the resulting difference (e.g., a negative result on the x-components of the coordinates may indicate that the indicia has a leftward direction across the FOV, a positive result on the y-components of the coordinates may indicate that the indicia has an upward direction across the FOV, etc.).

Additionally or alternatively, in some embodiments, the computer-implemented method may further include determining, by the processing assembly, an initial size of the indicia in the initial image frame based upon a pixel count of at least a portion of the indicia in the initial image frame; determining, by the processing assembly, a subsequent size of the indicia in the subsequent image frame based upon a pixel count of at least the portion of the indicia in the subsequent image frame; and/or responsive to determining the subsequent size of at least the portion of the indicia to be greater than the initial size of at least the portion of the indicia, transmitting, by the processing assembly to the host processor, the decoded indicia data of the indica. In these embodiments, a third dimensional direction may be inferred by the resulting pixel counts (e.g., the indicia is moving towards one or more of the one or more image sensors if the pixel count of the subsequent image frame is larger than the pixel count of the initial image frame, etc.). In some other embodiments, this inference may be determined by taking the differences between the two sets of coordinates and determining the signs of each component coordinate. For example, if the differences between the x-components of the x1y1 coordinates—corresponding to the upper-left most point of the indicia—are negative, and the differences between the x-components of the x2y2 coordinates—corresponding to the upper-right most point of the indicia—are positive, then it may be inferred that the indicia moved towards one or more of the one or more image sensors.

Additionally or alternatively, in some embodiments, the FOV may include a set of sub-FOVs, wherein at least one sub-FOV of the set of sub-FOVs corresponds to a set of coordinates of image data relating to a periphery of the FOV. In these embodiments, the computer-implemented method may further include determining, by the processing assembly, whether the first location associated with the indicia is inside the at least one sub-FOV; determining, by the processing assembly, whether the second location associated with the indicia is outside the at least one sub-FOV; and/or responsive to determining the first location associated with the indicia is inside the at least one sub-FOV and determining the second location associated with the indicia is outside the at least one sub-FOV, transmitting, by the processing assembly to the host processor, the decoded indicia data of the indica. Additionally or alternatively, the computer-implemented method may further include determining, by the processing assembly, whether the first location associated with the indicia is outside the at least one sub-FOV and/or responsive to determining the first location associated with the indicia is outside the at least one sub-FOV, transmitting, by the processing assembly to the host processor, the decoded indicia data of the indica.

Additionally or alternatively, in some embodiments, the computer-implemented method may further include generating, by the processing assembly, a bounding box around the indicia based upon the first location and/or the second location; determining, by the processing assembly, whether the orientation of the indicia exceeds a threshold angle relative to the center of the FOV based upon the bounding box of the indicia; and/or responsive to determining the orientation of the indicia exceeds a threshold angle relative to the center of the FOV, transmitting, by the processing assembly to the host processor, the decoded indicia data of the indica. For example, until the processing assembly determines the indicia has a threshold angle of 45 degrees in any direction pivoted toward one or more of the one or more image sensors, the processing assembly may withhold transmitting the decoded indicia data to the host processor. Additionally or alternatively, in some embodiments, the processing assembly may be configured to first determine the orientation of the indicia first prior to decoding the indicia. In these embodiments, the processing assembly may locate the indicia in the image data, even if the indicia is not within a threshold distance to the one or more image sensors (for example, by generating and searching through a high contrast version of the image data). If the processing assembly determines that the indicia is angled toward the center of the FOV, the processing assembly may attempt to decode the indicia as the angled indicia will limit the resolution of the indicia, allowing the processing assembly to decode the indicia.

Additionally or alternatively, in some embodiments, the computer-implemented method may further include decoding, by the processing assembly, an another indicia in an intermediate image frame of the plurality of image frames to generate decoded indicia data of the another indica, wherein the intermediate image frame is a predetermined number of image frames or a predetermined time interval after the initial image frame; determining, by the processing assembly, a third location associated with the another indicia in the intermediate image frame, wherein the third location corresponds to a third set of coordinates in the image data; determining, by the processing assembly, a fourth location associated with the another indicia in an ensuing image frame, wherein the fourth location corresponds to a fourth set of coordinates in the image data and wherein the ensuing image frame is a predetermined number of image frames or a predetermined time interval after the intermediate image frame; and/or transmitting, by the processing assembly to the host processor, the decoded indicia data of the another indicia for analysis of the decoded indicia data of the another indicia based upon at least one of the third location or the fourth location.

In yet another embodiment, the present invention may be an imaging device comprising: (1) one or more image sensors that may collectively have a field of view (FOV) over which to capture image data and/or (2) a processing assembly communicatively coupled to the one or more image sensors. The processing assembly may be configured to: (i) instruct the one or more image sensors to capture the image data, wherein the image data may include a plurality of image frames over the FOV, (ii) detect an object within the FOV, (iii) identify, using a trained machine learning model, the object, (iv) determine a first location associated with the object in the FOV in an initial image frame, wherein the first location corresponds to a first set of coordinates in the image data, (v) determine a second location associated with the object in the FOV in a subsequent image frame, wherein the second location corresponds to a second set of coordinates in the image data and wherein the second image frame is a predetermined number of image frames or a predetermined time interval after the initial image frame, and/or (vi) transmit the identification to a host processor for analysis of the identification based upon at least one of the first location or the second location.

Advantages will become more apparent to those of ordinary skill in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
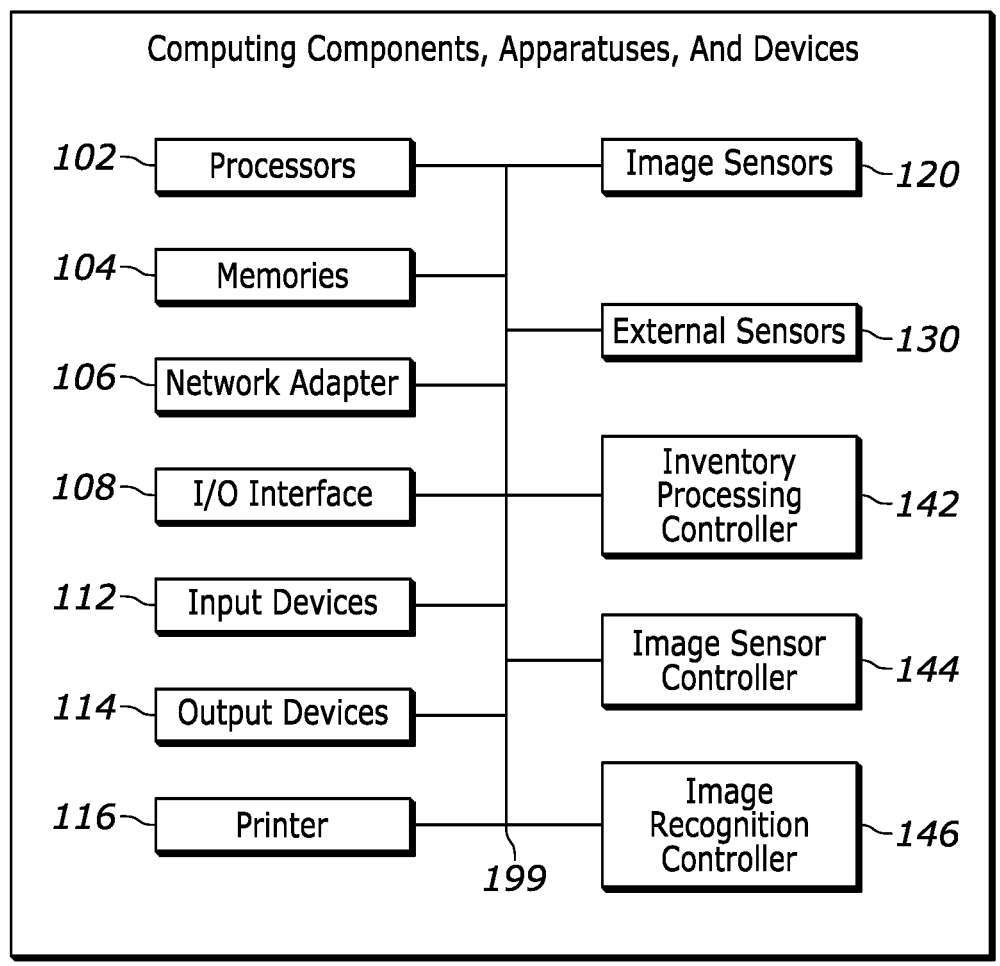
FIG. 1A illustrates exemplary components, apparatuses, and devices for implementing the methods and systems for avoidance of unintended indicia scanning.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure relates generally to an imaging device that may include one or more image sensors, a processing assembly, and/or a host processor. The image sensors capture images of objects in a field of view (FOV), such as objects displaying indicia, and that captured image data is sent to the processing assembly for decoding. With the present techniques, however, the processing assembly may process those captured images to determine the indicia's location on the objects in the images as well as the indicia's (1) displacement, (2), direction, and/or (3) perceived size difference across the captured images. In the instances where the displacement does not exceed a threshold value, the direction is not toward the center of the FOV, and/or the perceived size difference is shrinking, the processing assembly may not send the decoded indicia data to the host processor. Inversely, in the instances where the displacement does exceed the threshold value, the direction is toward the center of the FOV, and/or the perceived size difference is growing, the processing assembly may send the decoded indicia data to the host processor. Additionally or alternatively, one or more sub-fields of view (sub-FOV) may be employed by the one or more image sensors. If the indicia are detected in peripheral sub-FOVs, the processing assembly may not send the decoded indicia data to the host processor until the indicia is detected in a primary sub-FOV. In these and other ways described herein, the present techniques can reduce the number of times the processing assembly sends the decoded indicia data to the host processor, thereby decreasing the number of times a customer is charged.

The methods, systems, and techniques described herein may be implemented by various types of imaging devices, including, but not limited to, handheld barcode scanners, hands-free barcode scanners, monoptic scanners, bioptic scanners, and/or machine vision systems that may perform indicia scanning and decoding.

FIG. 1A illustrates example components, apparatuses, and devices 100a that may be used for implementing the methods and systems for avoidance of unintended indicia scanning. The example components, apparatuses, and devices 100a may include one or more processors 102, one or more memories 104, one or more network adapters 106, one or more input/output (I/O) interfaces 108, one or more input devices 112, one or more output devices 114, one or more printers 116, one or more image sensors 120, one or more external sensors 130, one or more inventory processing controllers 142, one or more image sensor controllers 144, and/or one or more image recognition controllers 146. Any of the exemplary computing components, apparatuses, and devices 100 may be communicatively coupled to one another via a communication bus 199.

The one or more processors 102 may be, or may include, one or more central processing units (CPU), one or more coprocessors, one or more microprocessors, one or more graphical processing units (GPU), one or more digital signal processors (DSP), one or more application specific integrated circuits (ASIC), one or more programmable logic devices (PLD), one or more field-programmable gate arrays (FPGA), one or more field-programmable logic devices (FPLD), one or more microcontroller units (MCUs), one or more hardware accelerators, one or more special-purpose computer chips, and one or more system-on-a-chip (SoC) devices, etc.

The one or more memories 104 may be, or may include, any local short term memory (e.g., random access memory (RAM), read only memory (ROM), cache, etc.) and/or any long term memory (e.g., hard disk drives (HDD), solid state drives (SSD), etc.). The one or more memories 104 may be communicatively coupled to the one or more processors 102.

The one or more network adapters 106 may be, or may include, a wired network adapter, connector, interface, etc. (e.g., an Ethernet network connector, an asynchronous transfer mode (ATM) network connector, a digital subscriber line (DSL) modem, a cable modem) and/or a wireless network adapter, connector, interface, etc. (e.g., a Wi-Fi connector, a Bluetooth® connector, an infrared connector, a cellular connector, etc.).

The one or more I/O interfaces 108 may be, or may include, any number of different types of I/O units and/or combined I/O circuits and/or I/O components that enable the one or more processors 102 to communicate with the one or more input devices 112 and/or the one or more output devices 114. The one or more input devices 112 may be, or may include, keyboards and/or keypads, interactive screens (e.g., touch screens), navigation devices (e.g., a mouse, a trackball, a capacitive touch pad, a joystick, etc.), microphones, buttons, communication interfaces, etc. The one or more output devices 114 may be, or may include display units (e.g., display screens, receipt printers, etc.), speakers, etc. The one or more I/O interfaces 108 may also be, or may include digital applications (e.g., local graphical user interfaces (GUIs)).

The one or more printers 116 may be, or may include, any sort of device that may produce a physical copy of electronic data (e.g., computer printers, fax machines, receipt machines, automated typewriters, etc.).

The one or more image sensors 120 may be, or may include, any image capturing device, unit, and/or component capable of capturing image data of a particular field of view (FOV) of the one or more image sensors 120. The image data may be, or may include, any electromagnetic data relating to the FOV (e.g., reflected light beams in a scanner, a digital image in the visible spectrum, a digital image in the infrared spectrum, etc.) that can be digitally stored or converted into data capable of digital storage. The term "image data" may refer to raw image data and/or lightly processed image data (e.g., compressed raw image data, scaled raw image data, time stamped raw image data, etc.). Additionally, "image data" may include data related to one or more images (e.g., one or more digital photographs, a burst photograph, a digital recording, etc.) including one or more image frames. In some embodiments, the one or more image sensors 120 may have a plurality of photosensitive elements that define a substantially flat surface that may also feature other components (e.g., a housing, lens(es), etc.) for capturing image data over the FOV. The arrangement and configuration of these components may define the FOV. It should be noted, that while the one or more image sensors 120 is described as capturing the image data over a particular FOV, the FOV can be split into multiple sub-fields of view (sub-FOV). Data captured through the sub-FOV of an one or more image sensors 120 would still be considered image data that is captured over the FOV of the one or more image sensors 120. In some embodiments, the one or more image sensors 120 may be communicatively coupled to the one or more processors 102 via a dedicated communication bus (e.g., communication bus 199).

The one or more external sensors 130 may be, or may include, one or more light sensors, one or more proximity sensors, one or more motion sensors, and/or one or more weight scales. The one or more external sensors 130 may be communicatively coupled to one or more processors 102 and/or the one or more image sensors 120. In some embodiments, the one or more external sensors 130 may engage the one or more image sensors 120 upon triggering via an external input. For example, an object may be placed on a weight scale which is also in the FOV of the one or more image sensors 120. The weight scale may then determine a change in weight and transmit a signal to the one or more image sensors 120 to capture an image of the object. It should be noted that other techniques, systems, and methods may be employed to engage the one or more image sensors 120, such as mechanical activation (e.g., the trigger of a hand-held barcode scanner), a timing mechanism, and/or the like.

The one or more inventory processing controllers 142, the one or more image sensor controllers 144, and/or the one or more image recognition controllers 146 may be, or may include, computer-readable, executable instructions that may be stored in the one or more memories 104 and/or performed by the one or more processors 102. Further, the computer-readable, executable instructions of the one or more inventory processing controllers 142, the one or more camera controllers 144, and/or the one or more image recognition controllers 146 may be stored on and/or performed by specifically designated hardware (e.g., micro controllers, microchips, etc.) which may have functionalities similar to the one or more memories 104 and/or the one or more processors 102.

Figure 1B:
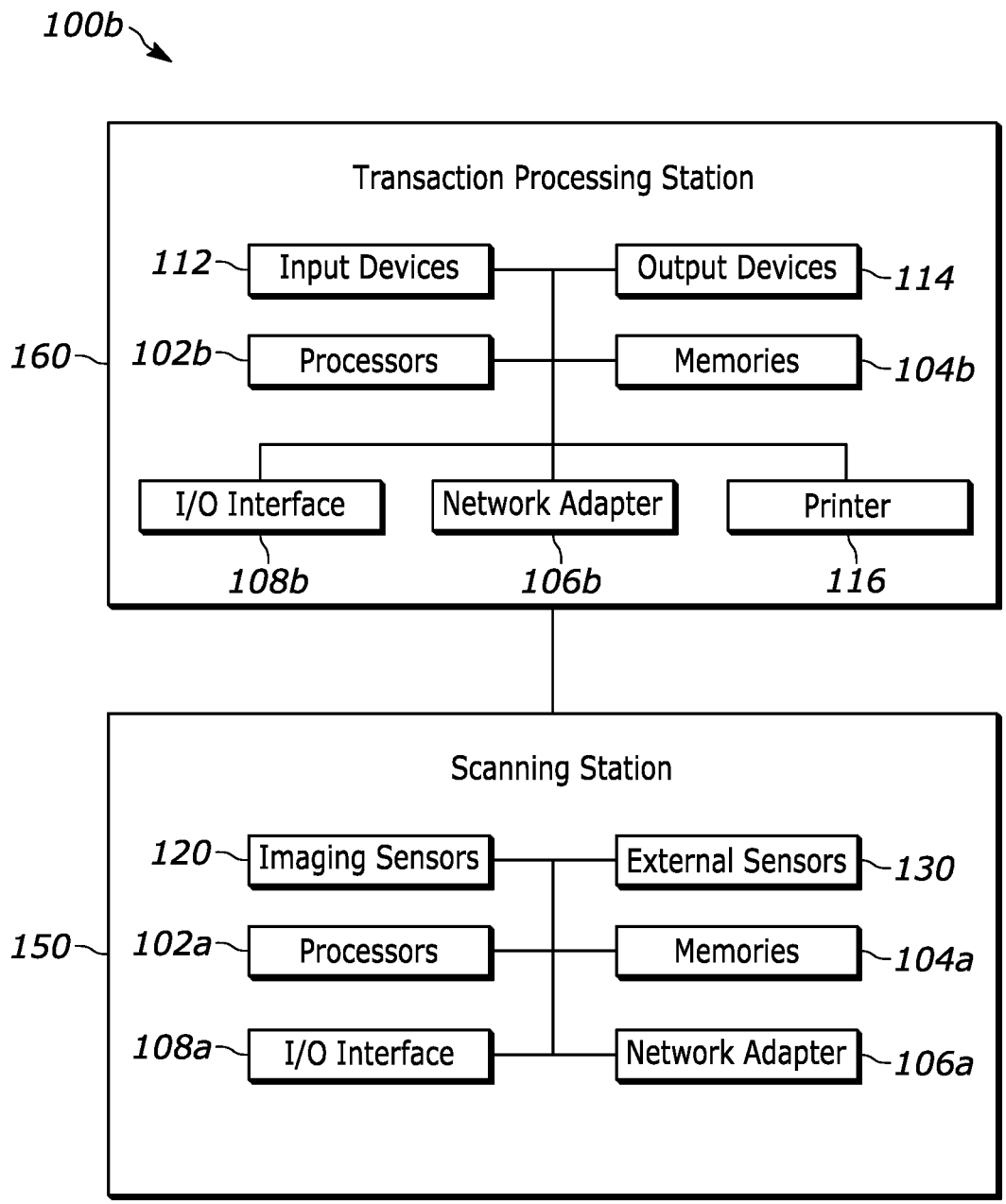
FIG. 1B illustrates exemplary devices and systems for implementing the methods and systems for avoidance of unintended indicia scanning.

FIG. 1B illustrates example devices and systems 100b to implement the methods and systems for avoidance of unintended indicia scanning. The example devices and systems 100b may include a scanning station 150 and/or a transaction processing station 160.

The scanning station 150 may include one or more processors 102a, one or more memories 104a, one or more network adapters 106a, one or more I/O interfaces 108a, one or more imaging sensors 120, and/or one or more external sensors 130.

The one or more memories 104a, the one or more network adapters 106a, the one or more I/O interfaces 108a, the one or more imaging sensors 120, and/or the one or more external sensors 130 of the scanning station 150 may be coupled to the one or more processors 102a of the scanning station 150 and/or with each other via any sort of omnibus. While only the one or more processors 102a, the one or more memories 104a, the one or more network adapters 106a, the one or more I/O interfaces 108a, the one or more imaging sensors 120, and/or the one or more external sensors 130 of the scanning station 150 are described herein, additional and/or alternative components of the scanning station 150 are contemplated. For example, the scanning station 150 may also include an image recognition controller 146.

The transaction processing station 160 may include one or more processors 102b, one or more memories 104b, one or more network adapters 106b, one or more I/O interfaces 108b, one or more input devices 112, one or more output devices 114, and/or one or more printers 116.

The one or more memories 104b, the one or more network adapters 106b, the one or more I/O interfaces 108b, the one or more input devices 112, the one or more output devices 114, and/or the one or more printers 116 of the transaction processing station 160 may be coupled to the one or more processors 102b of the transaction processing station 160 and/or with each other via any sort of omnibus. While only the one or more processors 102b, the one or more memories 104b, the one or more network adapters 106b, the one or more I/O interfaces 108b, the one or more input devices 112, the one or more output devices 114, and/or the one or more printers 116 of the transaction processing station 160 are described herein, additional and/or alternative components of the transaction processing station 160 are contemplated. For example, the transaction processing station 160 may also include an inventory processing controller 144 as well as a bill processing controller and/or a transaction controller, not shown.

FIGS. 2A, 2B, 2C, and 2D illustrate example environments 200a, 200b, 200c, and 200d, respectfully, for devices and systems for avoidance of unintended indicia scanning. The example environments 200a, 200b, 200c, and 200d may include a scanning station 150 having a field of view (FOV) 212 to capture image data of one or more objects featuring one or more indicia 220. In some embodiments, the scanning station 150 may include a housing body 202 that houses the one or more image sensors 120, a designated scanning area 204, and/or a optically transmissive window and/or optically reflective window 214 as illustrated in FIGS. 2A, 2B, 2C, and 2D. The indicia may be, or may include, any encrypted and decodable image capable of storing information (e.g., a 1-dimensional (1D) or 2-dimensional (2D) barcode (e.g., a quick response (QR) code or a direct part making (DPM) code)), or any other indicia encoding a payload that may be decoded.

The scanning station 150 may include any of the example components, apparatuses, and devices 100 illustrated in FIG. 1. In some embodiments, an object featuring an indicia 220 may enter the FOV 212 of the one or more image sensors 120 of the scanning station 150. While the object in the FIGs. is shown has having a single indicia 220, in some examples, an object may have multiple indicia. Such multiple indicia, as is the case with the indicia 220, may be of different types. For example, an object may include a QR code and a barcode, or a barcode and a DPM code. In some embodiments, multiple objects each featuring an indicia may enter the FOV 212 of the scanning station 150. Depending on position and orientation of the object, the edges of the indicia 220 may be aligned or may not be aligned with the edges of the FOV 212. Once within the FOV 212, the one or more image sensors 120 may capture image data of the object featuring the indicia 220. If multiple objects are in the FOV 212, the image data will include the multiple objects. Similarly, if multiple indicia 220 are in the FOV 212, the image data will include the multiple indicia 220. In this way, the image data corresponds to one or more 2D images of the FOV 212 of the one or more image sensors 120. In some embodiments, the one or more image sensors 120 are engaged in response to a triggering of the one or more external sensors 130 (e.g., a proximity sensor adjacent to the one or more image sensors 120 triggers once the object featuring an indicia 220 crosses a threshold distance to the proximity sensor which is also within the FOV 212 of the image sensor). The one or more image sensors 120 may pass the image data to a processing assembly (e.g., the one or more processors 102).

The processing assembly may detect, locate, and/or decode the one or more indicia 220 in the image data upon receiving the image data. The decoded indicia data may be stored in the one or more registers of the processing assembly and/or one or more memory units communicatively coupled to the processing assembly. In this way, the processing assembly may be able to track the indicia 220 across image frames of the image data and/or prevent the repeated decoding of the indicia 220.

In some instances, the indicia 220 may be missing from one or more image frames of the image data. For example, the object holding the indicia 220 may be rotated out of view of the one or more image sensors 120, nudged outside of the FOV 212, and/or may be obstructed by another object. Nevertheless, the processing assembly may utilize the stored locational data of the indicia 220 to recognize and/or track the indicia 220 across the image data. In some embodiments, the processing assembly may track the indicia 220 based upon the position of the indicia 220 across the image frames. For example, the processing assembly may be able to accurately infer that the detected indicia 220 across the image frames is the same if a determined displacement of the indicia 220 across the image frames is below a set threshold value. Additionally or alternatively, in some embodiments, the processing assembly may track the indicia 220 based upon the particular symbol of the indicia 220 across the image frames. For example, the processing assembly may be able to accurately infer that the indicia 220 across the image frames is the same if it recognizes that it is the indicia 220 features the same symbol across the image frames. Both of these techniques may be used in combination for additional accuracy (e.g., the image data features two objects with the same indicia 220 and/or the object featuring the indicia 220 is quickly swiped across the one or more image sensors 120). Additionally or alternatively, the processing assembly may be able to use the foregoing tracking techniques to prevent repeat decoding of the indicia 220 across the one or more image frames.

In addition to tracking the indicia 220 across the one or more image frames, the processing assembly may use the location data of the indicia 220 across the one or more image frames to (i) determine whether the indicia 220 has moved a threshold distance across the image data, (ii) determine a direction of the indicia 220, (iii) determine a perceived size of at least a portion the indicia 220, and/or (iv) determine an orientation of the indicia 220. For example, if the processing assembly determines that the indicia 220 has moved a threshold distance across the image data, the processing assembly may accurately infer that the indicia 220 is being scanned and pass the decoded indicia data to a host processor (e.g., the transaction processing station 160). As another example, if the processing assembly determines that the indicia 220 has a direction towards the center of the FOV 212, the processing assembly may accurately infer that the indicia 220 is being scanned and pass the decoded indicia data to a host processor (e.g., the transaction processing station 160). As yet another example, if the processing assembly determines that at least a portion the indicia 220 has a perceived size that is growing across the image frames, the processing assembly may accurately infer that the indicia 220 moving toward the one or more image sensors 120 for a better scan and pass the decoded indicia data to a host processor (e.g., the transaction processing station 160). As yet another example, if the processing assembly determines that an orientation of the indicia 220 exceeds a threshold angle relative to the centroid of the FOV (e.g., by generating a bounding box around the indicia and determining the angles of the bounding box), the processing assembly may accurately infer that the indicia 220 is being angled toward the center of the FOV.

Figure 2A:
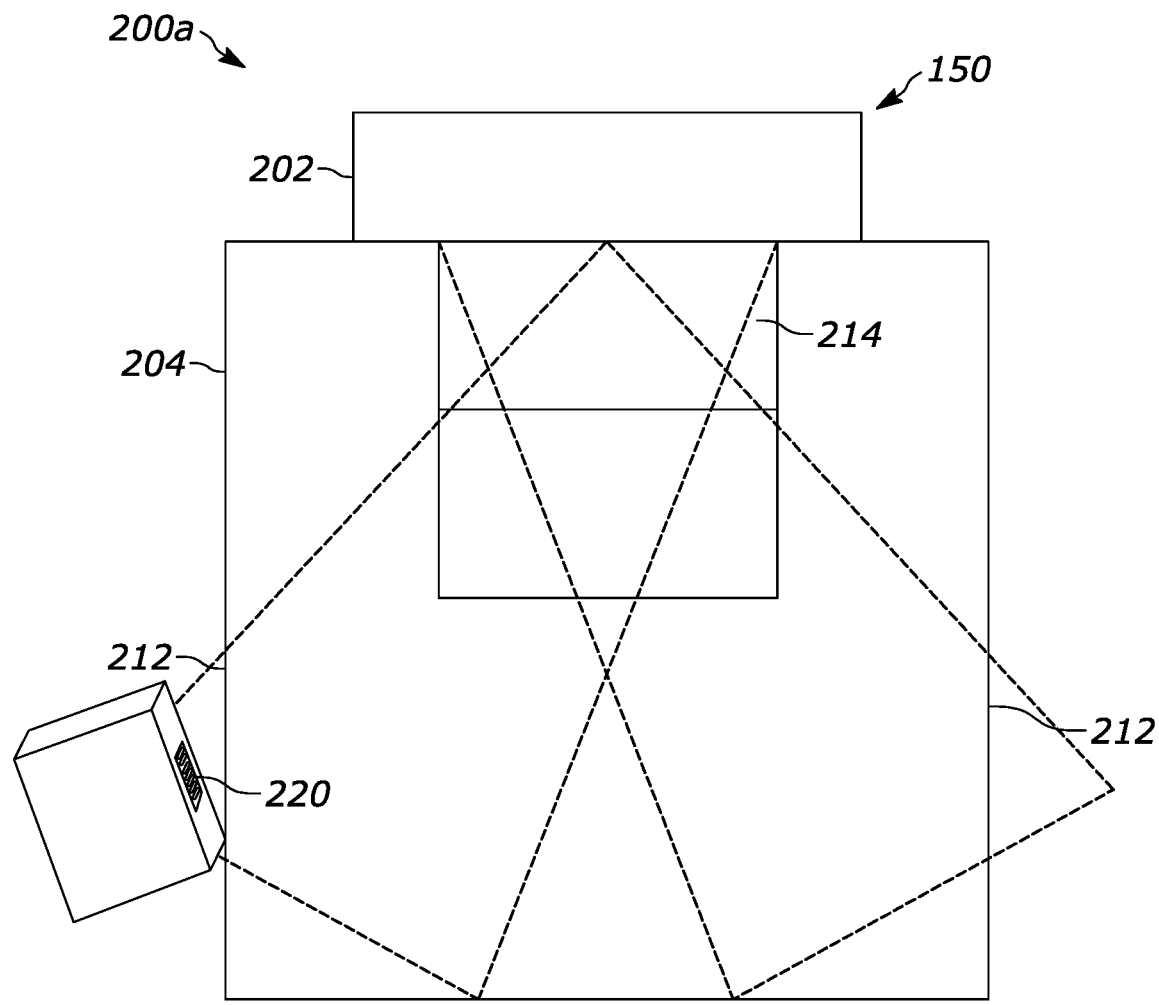
FIG. 2A illustrates an example bioptic image scanning environment for implementing the indicia location coprocessor.
Figure 2B:
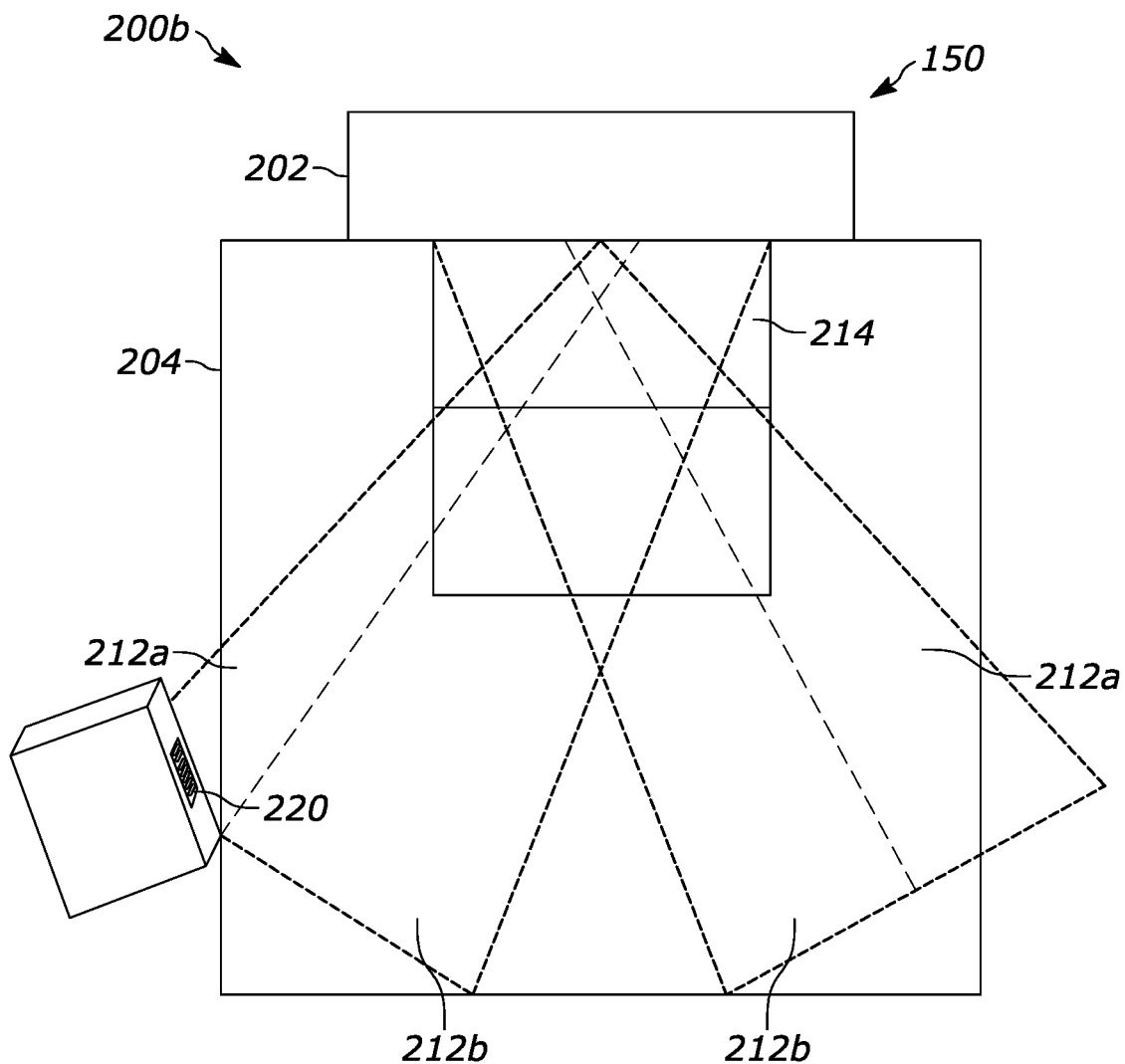
FIG. 2B illustrates an example bioptic image scanning environment with multiple sub-fields of view for implementing the indicia location coprocessor.
Figure 2C:
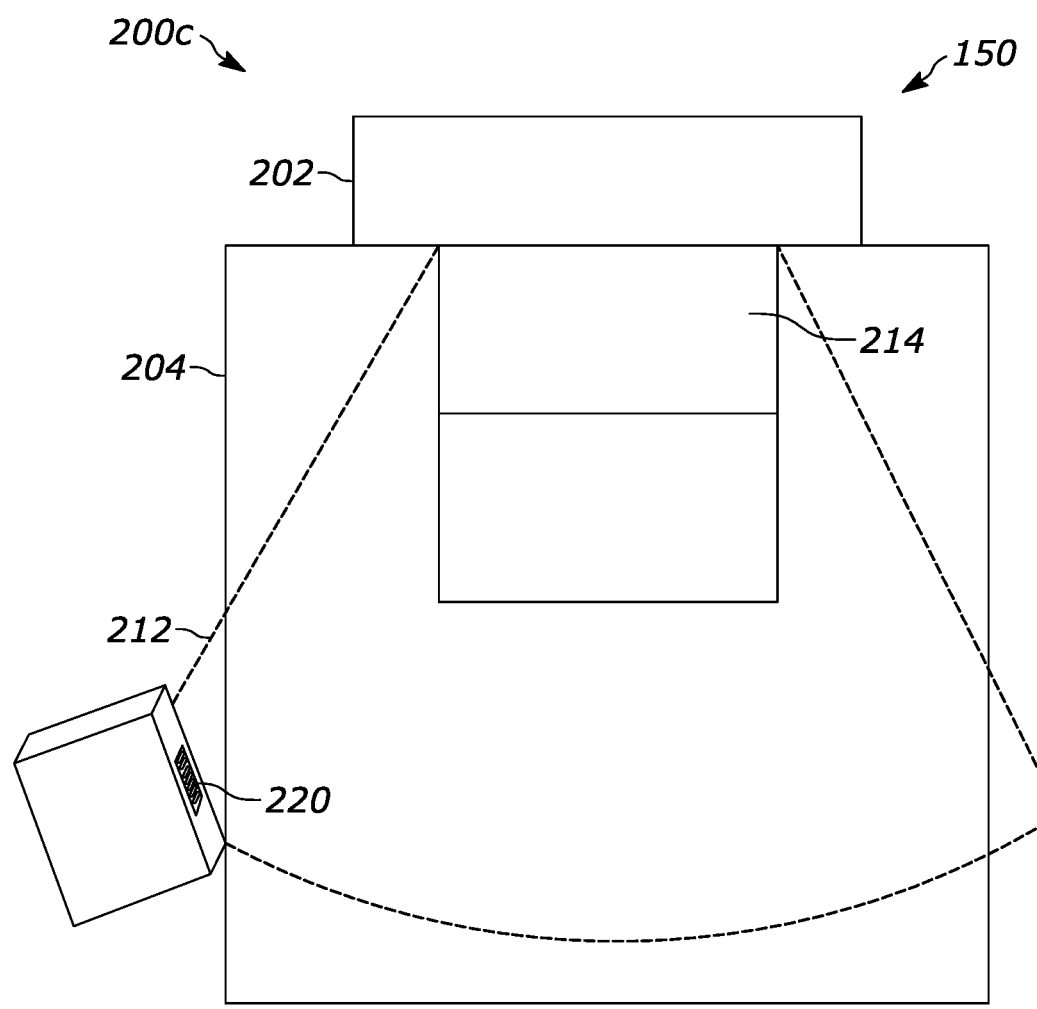
FIG. 2C illustrates an example monoptic image scanning environment for implementing the indicia location coprocessor.
Figure 2D:
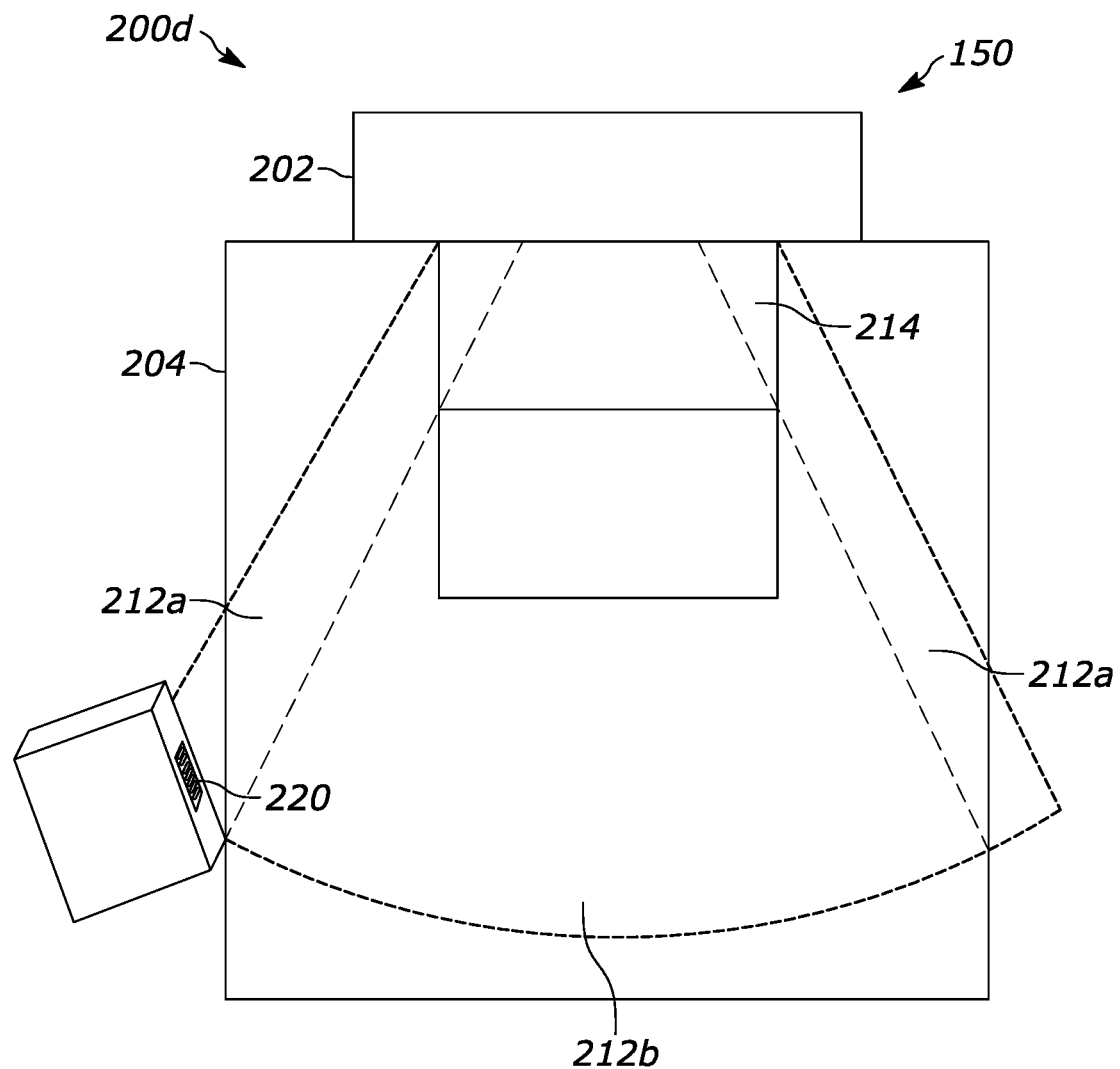
FIG. 2D illustrates an example monoptic image scanning environment with multiple sub-fields of view for implementing the indicia location coprocessor.

In some embodiments, the FOV 212 may have one or more sub-fields of view (sub-FOVs) as illustrated in FIGS. 2B and 2D. In these embodiments, at least one sub-FOV may be a peripheral sub-FOV 212a corresponding to a portion of the FOV that extends past the designated scanning area 204. Additionally, in some embodiments, at least one other sub-FOV may be a primary sub-FOV 212b corresponding to a portion of the FOV that does not extend past the designated scanning area 204.

Additionally or alternatively, if the processing assembly determines that the location of the indicia 220 is initially in a primary sub-FOV 212b, the processing assembly may immediately transmit the decoded indicia data to the host processor. Additionally or alternatively, if the processing assembly determines that the location of the indicia 220 is initially in a peripheral sub-FOV 212a, the processing assembly may withhold transmitting the decoded indicia data to the host processor until any of the foregoing determinations are made (e.g., the processing assembly determines that the displacement of the indicia 220 across the image frames exceeds the threshold value, the processing assembly determines that the direction of the indicia 220 across the image frames is toward the center of the peripheral FOV 212a and/or the primary sub-FOV 212b, and/or the processing assembly determines that the perceived size of at least a portion of the indicia 220 is growing across the image frames) and/or the processing assembly detects the indicia 220 is within the primary sub-FOV 212b. Once any of the foregoing conditions are met, the processing assembly may transmit the decoded indicia data to the host processor.

Figure 3:
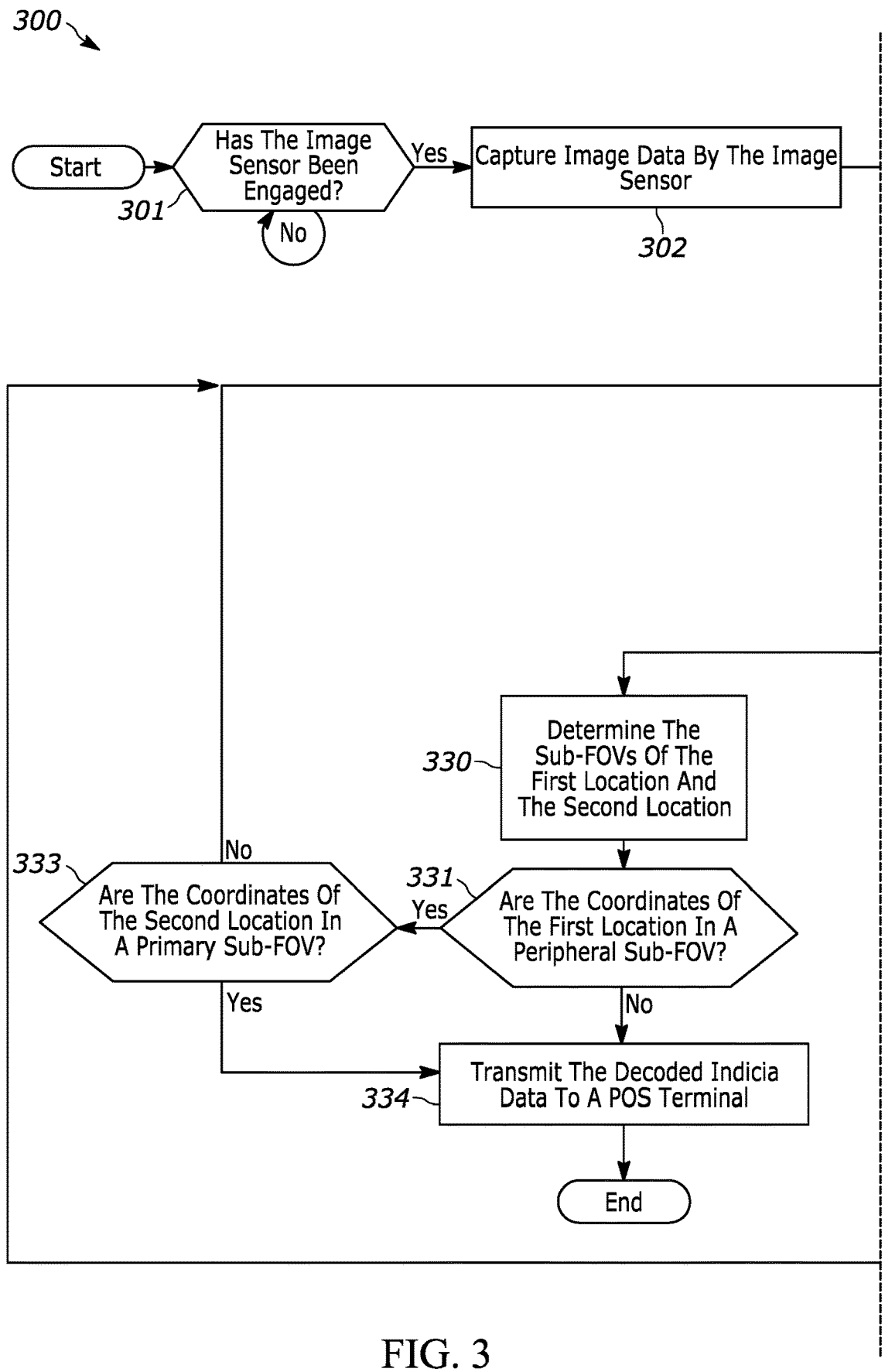
FIG. 3 is a block diagram of an example flowchart for implementing example methods and/or operations described herein.
Figure 3:
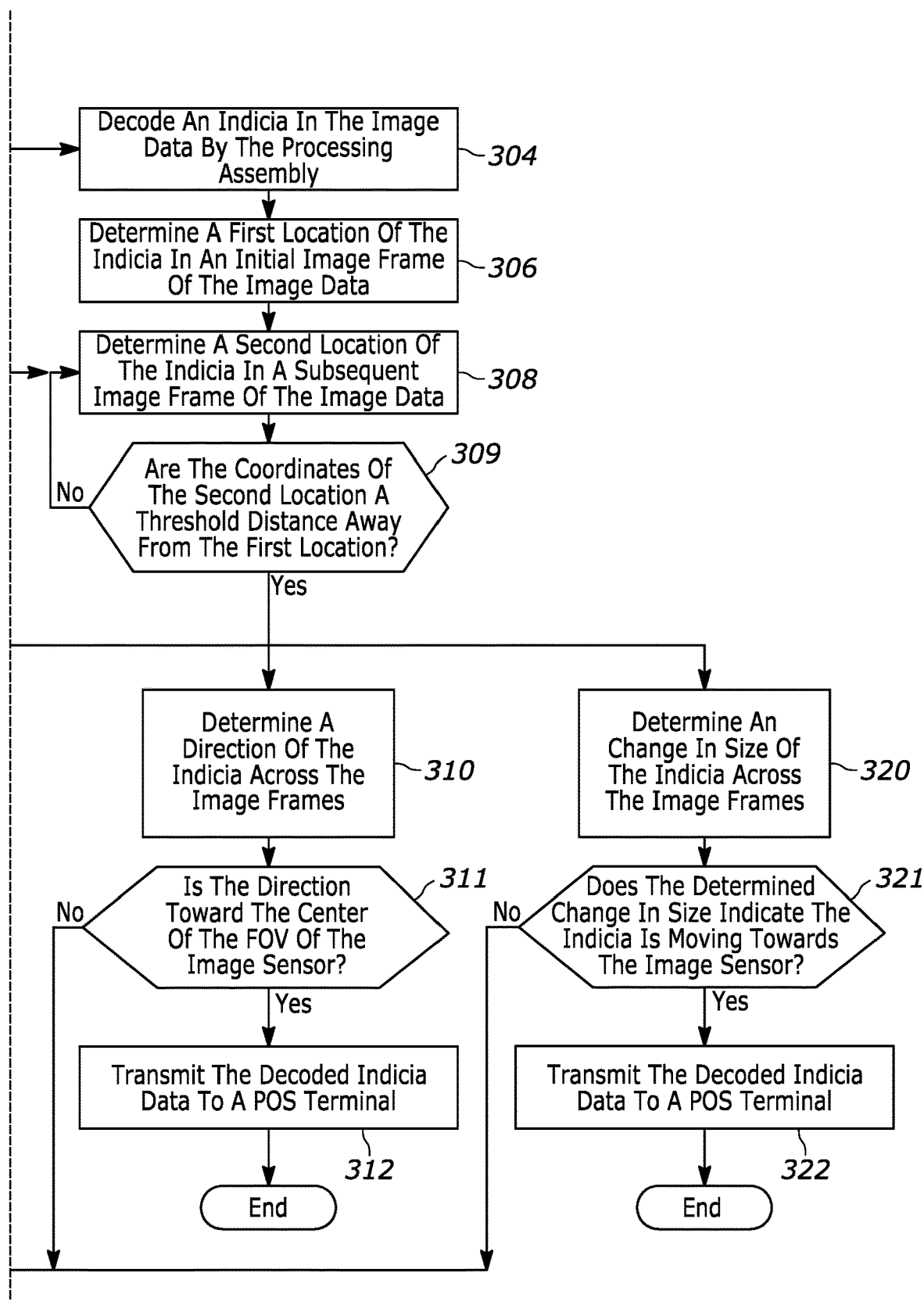

FIG. 3 illustrates a block diagram representative of an example flowchart capable of implementing the methods and systems for avoidance of unintended indicia scanning as described in FIGS. 1-2D. The example flowchart of FIG. 3 is an example processing platform 300 capable of executing instructions to, for example, implement operations of the example methods described herein, as may be represented by the flowcharts of the drawings that accompany this description. Other example flowcharts capable of, for example, implementing operations of the example methods described herein include field programmable gate arrays (FPGAs) and application specific integrated circuits (ASICs).

The example processing platform 300 of FIG. 3 may be implemented by the one or more processors 102. The one or more processors 102 may include one or more registers capable of temporarily storing data, and the one or more processors 102 may include further storage capacity in the form of integrated memory slots. The one or more processors 102 may also be communicatively coupled to the one or more memories 104. The one or more processors 102 may interact with the any of the forgoing (e.g., registers, integrated memory slots, one or more memories 104) to obtain, for example, machine-readable instructions corresponding to, for example, the operations represented by the flowcharts of this disclosure.

The example processing platform 300 may begin with the one or more image sensors 120 being engaged to capture image data (301). If the one or more image sensors 120 have not been engaged, the example processing platform 300 may continue waiting at block 301. If the one or more image sensors 120 have been engaged (e.g., upon the one or more external sensors 130 triggering and engaging the one or more image sensors 120), the one or more image sensors 120 may capture image data (302).

Once the image data has been captured, any indicia in the image data may be decoded by a processing assembly (e.g., the one or more processors 102) (304). The processing assembly may determine a first location of the indicia in an initial image frame of the image data (306). It should be noted that the initial image frame need not be the first image frame in the image data. The first location of the indicia may be a first set of coordinates in the image data corresponding to the indicia's position in the FOV at the initial image frame (e.g., a set of four points relating to the corners of the indicia, a centroid of the indicia, a rectified bounding box of the indicia, an aligned bounding box, etc.). The processing assembly may determine a second location of the indicia in a subsequent image frame of the image data (308), wherein the subsequent image frame is a predetermined number of image frames after the initial image frame. The second location of the indicia may be a second set of coordinates in the image data corresponding to the indicia's position in the FOV at the subsequent image frame. The processing assembly may determine whether the indicia has moved a threshold distance based upon the coordinates of the second location and the first location (309). For example, the processing assembly may take the absolute value of the difference between the second set of coordinates and the first set of coordinates and compare the result to a predetermined threshold value. In this example, the processing assembly may determine the indicia has moved a threshold distance if the resulting absolute value of the difference exceeds the predetermined threshold value. If the processing assembly determines that the indicia has not moved a threshold distance (309), the processing assembly may determine another second location of the indicia in a yet subsequent image frame of the image data (308), wherein this subsequent image frame is a predetermined number of image frames after the prior subsequent image frame.

In some embodiments, if the processing assembly determines that the indicia has moved a threshold distance (309), the processing assembly may determine a direction of the indicia across the image frames (310). For example, if the processing assembly takes the difference between the second set of coordinates and the first set of coordinates, the processing assembly may infer based upon the sign of the individual coordinates that the indica moved in a certain direction (e.g., a positive x-coordinate values indicate the indicia moved to the left across the FOV, a positive y-coordinate values indicate the indicia moved upward across the FOV, etc.). The processing assembly may determine whether the determined direction of the indicia is towards the center of the FOV (311). If the processing assembly determines that the determined direction of the indicia is not towards the center of the FOV (311), the processing assembly may determine another second location of the indicia in a yet subsequent image frame of the image data (308), wherein this subsequent image frame is a predetermined number of image frames after the last prior subsequent image frame. If the processing assembly determines that the determined direction of the indicia is towards the center of the FOV (311), the processing assembly may transmit the decoded indicia data to a point-of-service (POS) terminal (e.g., the transaction processing station 160). The example processing platform 300 may then exit.

Additionally or alternatively, in some embodiments, if the processing assembly determines that the indicia has moved a threshold distance (309), the processing assembly may determine a change in size of at least a portion of the indicia across the image frames (320). For example, if the processing assembly takes the difference between the second set of coordinates and the first set of coordinates, and the signs of the resulting differences are not uniform, the processing assembly may infer that the indica moved either closer or further from the one or more image sensors 120 by a perceived growth or reduction in size of at least a portion of the indicia (e.g., a positive first and third coordinate and a negative second and fourth coordinate indicate the indicia moved closer to the one or more image sensors 120, etc.). The processing assembly may determine whether the determined change in size of at least a portion of the indicia implies a movement towards the one or more image sensors 120 (321). If the processing assembly determines that the determined change in size of at least a portion of the indicia does not imply a movement towards the one or more image sensors 120 (321), the processing assembly may determine another second location of the indicia in a yet subsequent image frame of the image data (308), wherein this subsequent image frame is a predetermined number of image frames after the last prior subsequent image frame. If the processing assembly determines that the determined change in size of at least a portion of the indicia implies a movement towards the one or more image sensors 120 (321), the processing assembly may transmit the decoded indicia data to the point-of-service (POS) terminal. The example processing platform 300 may then exit.

Additionally or alternatively, in some embodiments, if the processing assembly determines that the indicia has moved a threshold distance (309), the processing assembly may determine the sub-FOVs of the first set of coordinates and the second set of coordinates (330). The processing assembly may determine whether the first set of coordinates are in a peripheral sub-FOV (331). If the processing assembly determines that the first set of coordinates are not in a peripheral sub-FOV (331), the processing assembly may transmit the decoded indicia data to the point-of-service (POS) terminal. The example processing platform 300 may then exit. If the processing assembly determines that the first set of coordinates are in a peripheral sub-FOV (331), the processing assembly may determine whether the second set of coordinates are in a primary sub-FOV (333). If the processing assembly determines that the second set of coordinates are in a primary sub-FOV (331), the processing assembly may transmit the decoded indicia data to the point-of-service (POS) terminal. The example processing platform 300 may then exit. If the processing assembly determines that the second set of coordinates are not in a primary sub-FOV (331), the processing assembly may determine another second location of the indicia in a yet subsequent image frame of the image data (308), wherein this subsequent image frame is a predetermined number of image frames after the last prior subsequent image frame.

Alternative implementations of the example processing platform 300 represented by the flowchart includes one or more additional or alternative elements, processes and/or devices. Additionally or alternatively, one or more of the example blocks of the flowchart may be combined, divided, re-arranged or omitted. Components represented by the blocks of the diagram are implemented by hardware, software, firmware, and/or any combination of hardware, software and/or firmware.

Figure 4:
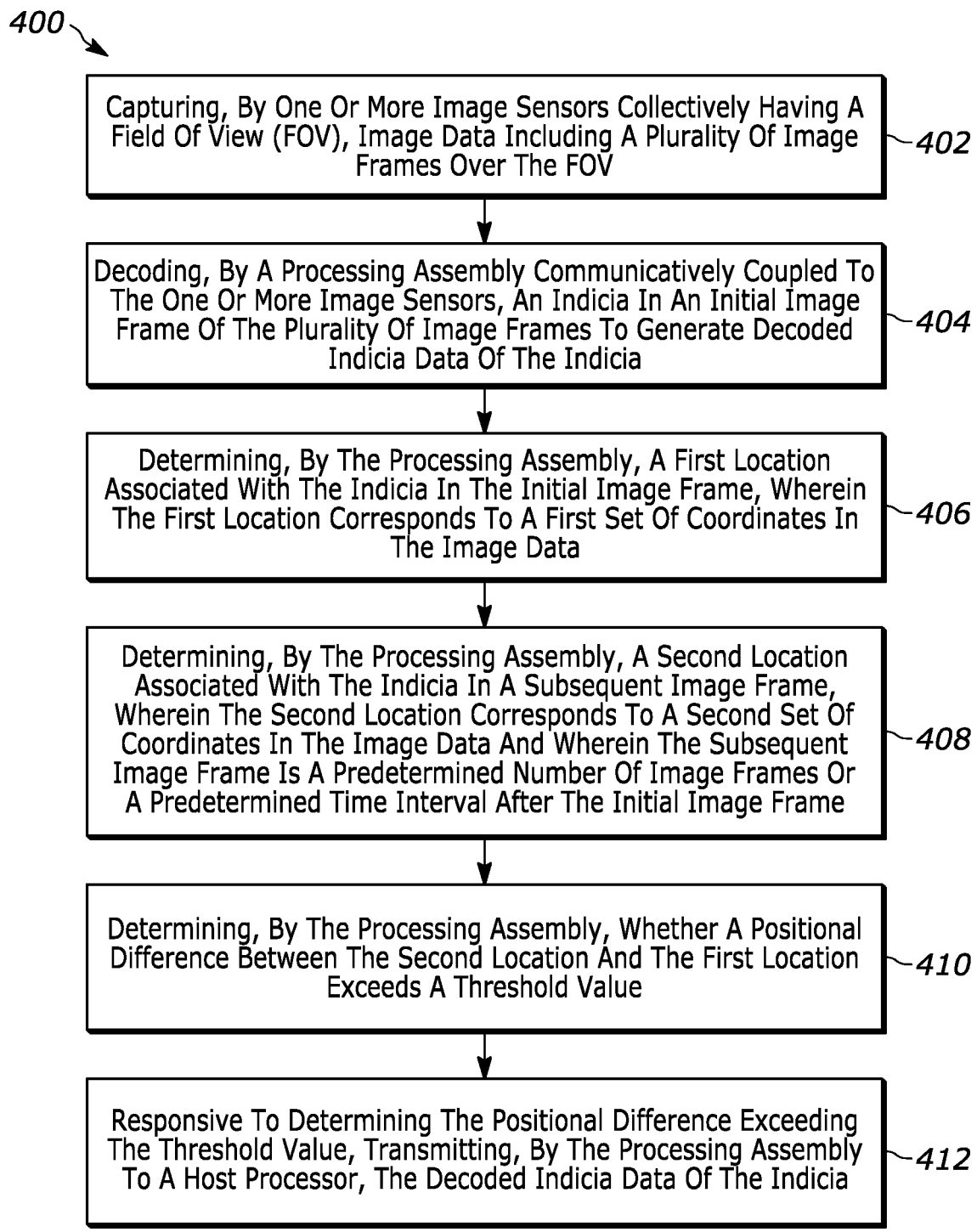
FIG. 4 is a block diagram of an example flowchart for an example method and/or operation described herein.

FIG. 4 is a block diagram of an example flowchart for an example method and/or operation 400 described herein. The method and/or operation 400 may employ any of the components, apparatuses, devices, and/or systems described herein with respect to FIGS. 1-3.

The method and/or operation 400 may begin at block 402 by capturing, by one or more image sensors (e.g., the one or more image sensors 120) collectively having a field of view (FOV), image data including a plurality of image frames over the FOV. In some embodiments, the one or more image sensors may be activated in response to (i) the triggering of one or more external sensors 130 (e.g., detected light from a light sensor, detected object from a proximity sensor, detected motion from a motion sensor, detected weight differential from a scale, etc.), (ii) mechanical activation (e.g., a physical trigger mechanism), and/or (iii) a timer reaching a threshold time. Additionally or alternatively, in some embodiments, the one or more image sensors 120, may capture a series of images at a first predetermined time interval.

The method and/or operation 400 may proceed to block 404 by decoding, by a processing assembly (e.g., the one or more processors 102) communicatively coupled to the one or more image sensors, an indicia in an initial image frame of the plurality of image frames to generate decoded indicia data of the indicia. In some embodiments, the processing assembly may lightly process the image data prior to decoding the indicia. For example, the processing assembly may maximize the contrast of the image to easily find the indicia within the image. In this way, the process may be able to find and/or decode the indicia in a more efficient manner than by scanning the entire image data.

The method and/or operation 400 may proceed to block 406 by determining, by the processing assembly, a first location associated with the indicia in the initial image frame, wherein the first location corresponds to a first set of coordinates in the image data. Additionally or alternatively, the first location of the indicia in the initial image frame may correspond to a rectified bounding box enclosing the indicia, an aligned bounding box enclosing the indicia, a centroid of the indicia, and/or (iv) any other image location indication and/or data derived from one or more portions of the image data.

The method and/or operation 400 may proceed to block 408 by determining, by the processing assembly, a second location associated with the indicia in a subsequent image frame, wherein the second location corresponds to a second set of coordinates in the image data and wherein the subsequent image frame is a predetermined number of image frames or a predetermined time interval after the initial image frame. Additionally or alternatively, the second location of the indicia in the subsequent image frame may correspond to a rectified bounding box enclosing the indicia, an aligned bounding box enclosing the indicia, a centroid of the indicia, and/or (iv) any other image location indication and/or data derived from one or more portions of the image data.

The method and/or operation 400 may proceed to block 410 by determining, by the processing assembly, whether a positional difference between the second location and the first location exceeds a threshold value. Similarly, in the embodiments where bounding boxes and/or centroids are used instead of sets of coordinates the processing assembly may determine the positional difference between the coordinates associated with the bounding boxes and/or centroids of the indicia, instead. In some embodiments, the positional difference is the absolute value of the difference between the coordinate points of the second location and the first location, as the absolute value can indicate a delta displacement of the indicia across image frames regardless of direction. Thus, if the delta displacement does not exceed a threshold value, the imaging device may determine that the indicia has barely moved across the image frames (e.g., it was nudged and/or adjusted in the FOV). Additionally or alternatively, in some embodiments, the positional data and/or the delta displacement may be stored in a register of the processing assembly and/or one or more memories 104 coupled to the processing assembly. In this way, in the event that the indicia disappears from one or more image frames of the image data (e.g., an object obscures it from the one or more image sensors 120), the processing assembly can determine that the indicia is the same one based on its relative position to the previously stored data (e.g., if the newly detected indicia is very close in space to the previously detected indicia, the processing assembly may accurately determine that it is the same indicia between image frames).

Additionally or alternatively, in some embodiments, the processing assembly may determine a direction of the indicia and/or a perceived size difference of at least a portion of the indicia across the image frames. Similar to the determined positional difference, the processing assembly may be able to accurately infer based on the direction and/or perceived size whether the indicia is intentionally being scanned. As an example, in the instances where the direction is determined to be towards the center of the one or more image sensors 120, the processing assembly may infer that someone is attempting to swipe the indicia across the imaging device. As another example, in the instances where the perceived size of at least a portion of the indicia is determined to be growing, the processing assembly may infer that someone is attempting to bring indicia closer to the one or more image sensors 120 to scan the indicia. Any of the foregoing techniques (e.g., determining the delta displacement, the direction, and/or the perceived size of at least a portion of the indicia) may be employed either individually or in combination with one another.

The method and/or operation 400 may proceed to block 412 by responsive to determining the positional difference exceeding the threshold value, transmitting, by the processing assembly to a host processor, the decoded indicia data of the indicia. The host processor may process the decoded indicia data further upon obtaining it (e.g., charging a customer of a transaction, etc.). In some embodiments, the host processor may be part of a device and/or system separate from the imaging device (e.g., a point of service (POS) terminal). In these embodiments, the one or more image sensors 120 may transmit the decoded indicia data to the host processor via either a wired connection and/or a wireless connection (e.g., Bluetooth®, Wi-Fi, etc.). In some other embodiments, the host processor may be communicatively coupled to the processing assembly (e.g., via communication bus 199).

The method and/or operation 400 may have more or less or different steps and/or may be performed in a different sequence.

In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit may include one or more processors 102. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device comprising:
one or more image sensors collectively having a field of view (FOV) over which to capture image data; and
a processing assembly communicatively coupled to the one or more image sensors and configured to:
instruct the one or more image sensors to capture the image data including a plurality of image frames over the FOV,
decode an indicia in an initial image frame of the plurality of image frames to generate decoded indicia data of the indicia,
determine a first location associated with the indicia in the initial image frame,
determine a second location associated with the indicia in a subsequent image frame, wherein the subsequent image frame is a predetermined number of image frames or a predetermined time interval after the initial image frame, determine whether a positional difference between the second location and the first location exceeds a threshold value, and responsive to determining the positional difference exceeding the threshold value, transmit the decoded indicia data of the indicia to a host processor.

2. The imaging device of claim 1, wherein the processing assembly is further configured to:

responsive to determining the positional difference does not exceed the threshold value, store the decoded indicia data in at least one of: (i) one or more registers of the processing assembly or (ii) one or more memories communicatively coupled to the processing assembly.

3. The imaging device of claim 1, wherein the processing assembly is further configured to:

determine a direction of the indicia based upon the positional difference between the second location and the first location, and responsive to determining the direction of the indicia being toward the center of the FOV, transmit the decoded indicia data of the indicia to the host processor.

4. The imaging device of claim 1, wherein the processing assembly is further configured to:

determine an initial size of the indicia in the initial image frame based upon a pixel count of at least a portion of the indicia in the initial image frame, determine a subsequent size of the indicia in the subsequent image frame based upon a pixel count of at least the portion of the indicia in the subsequent image frame, and responsive to determining the subsequent size of at least the portion of the indicia to be greater than the initial size of at least the portion of the indicia, transmit the decoded indicia data of the indicia to the host processor.

5. The imaging device of claim 1, wherein the FOV includes a set of sub-FOVs and wherein at least one sub-FOV of the set of sub-FOVs corresponds to a set of coordinates of image data relating to a periphery of the FOV.

6. The imaging device of claim 5, wherein the processing assembly is further configured to:

determine whether the first location associated with the indicia is inside the at least one sub-FOV, determine whether the second location associated with the indicia is outside the at least one sub-FOV, and responsive to determining the first location associated with the indicia is inside the at least one sub-FOV and determining the second location associated with the indicia is outside the at least one sub-FOV, transmit the decoded indicia data of the indicia to the host processor.

7. The imaging device of claim 6, wherein the processing assembly is further configured to:

determine whether the first location associated with the indicia is outside the at least one sub-FOV, and responsive to determining the first location associated the indicia is outside the at least one sub-FOV, transmit the decoded indicia data of the indicia to the host processor.

8. The imaging device of claim 1, wherein the processing assembly is further configured to:

generate a bounding box around the indicia based upon the first location and/or the second location, determine whether an orientation of the indicia exceeds a threshold angle relative to the centroid of the FOV based upon the bounding box of the indicia, and responsive to determining the orientation of the indicia exceeds the threshold angle relative to the centroid of the FOV, transmit the decoded indicia data of the indicia to the host processor.

9. The imaging device of claim 1, wherein the processing assembly is further configured to:

decode an another indicia in an intermediate image frame of the plurality of image frames to generate decoded indicia data of the another indicia, wherein the intermediate image frame is a predetermined number of image frames or a predetermined time interval after the initial image frame, determine a third location associated with the another indicia in the intermediate image frame, wherein the third location corresponds to a set of coordinates in the image data, determine a fourth location associated with the another indicia in an ensuing image frame, wherein the fourth location corresponds to another set of coordinates in the image data and wherein the ensuing image frame is a predetermined number of image frames or a predetermined time interval after the intermediate image frame, and transmit the decoded indicia data of the another indicia to the host processor for analysis of the decoded indicia data of the another indicia based upon at least one of the third location or the fourth location.

10. The imaging device of claim 1, wherein the first location corresponds to a first set of coordinates in the image data and the second location corresponds to a second set of coordinates in the image data.

11. A computer-implemented method comprising:

capturing, by one or more image sensors collectively having a field of view (FOV), image data including a plurality of image frames over the FOV;

decoding, by a processing assembly communicatively coupled to the one or more image sensors, an indicia in an initial image frame of the plurality of image frames to generate decoded indicia data of the indicia;

determining, by the processing assembly, a first location associated with the indicia in the initial image frame;

determining, by the processing assembly, a second location associated with the indicia in a subsequent image frame, wherein the subsequent image frame is a predetermined number of image frames or a predetermined time interval after the initial image frame;

determining, by the processing assembly, whether a positional difference between the second location and the first location exceeds a threshold value; and responsive to determining the positional difference exceeding the threshold value, transmitting, by the processing assembly to a host processor, the decoded indicia data of the indicia.

12. The computer-implemented method of claim 11 further comprising:

responsive to determining the positional difference does not exceed the threshold value, storing, by the processing assembly in at least one of: (i) one or more registers of the processing assembly or (ii) one or more memories communicatively coupled to the processing assembly, the decoded indicia data.

13. The computer-implemented method of claim 11 further comprising:

determining, by the processing assembly, a direction of the indicia based upon the positional difference between the second location and the first location; and responsive to determining the direction of the indicia being toward the center of the FOV, transmitting, by the processing assembly to the host processor, the decoded indicia data of the indicia.

14. The computer-implemented method of claim 11 further comprising:
determining, by the processing assembly, an initial size of the indicia in the initial image frame based upon a pixel count of at least a portion of the indicia in the initial image frame;
determining, by the processing assembly, a subsequent size of the indicia in the subsequent image frame based upon a pixel count of at least the portion of the indicia in the subsequent image frame; and
responsive to determining the subsequent size of at least the portion of the indicia to be greater than the initial size of at least the portion of the indicia, transmitting, by the processing assembly to the host processor, the decoded indicia data of the indicia.

15. The computer-implemented method of claim 11, wherein the FOV includes a set of sub-FOVs and wherein at least one sub-FOV of the set of sub-FOVs corresponds to a set of coordinates of image data relating to a periphery of the FOV.

16. The computer-implemented method of claim 15 further comprising:
determining, by the processing assembly, whether the first location associated with the indicia is inside the at least one sub-FOV;
determining, by the processing assembly, whether the second location associated with the indicia is outside the at least one sub-FOV; and
responsive to determining the first location associated with the indicia is inside the at least one sub-FOV and determining the second location associated with the indicia is outside the at least one sub-FOV, transmitting, by the processing assembly to the host processor, the decoded indicia data of the indicia.

17. The computer-implemented method of claim 16 further comprising:
determining, by the processing assembly, whether the first location associated with the indicia is outside the at least one sub-FOV; and
responsive to determining the first location associated with the indicia is outside the at least one sub-FOV, transmitting, by the processing assembly to the host processor, the decoded indicia data of the indicia.

18. The computer-implemented of claim 11 further comprising:
generating, by the processing assembly, a bounding box around the indicia based upon the first location and/or the second location;
determining, by the processing assembly, whether an orientation of the indicia exceeds a threshold angle relative to the centroid of the FOV based upon the bounding box of the indicia; and
responsive to determining the orientation of the indicia exceeds the threshold angle relative to the centroid of the FOV, transmitting, by the processing assembly to the host processor, the decoded indicia data of the indicia.

19. The computer-implemented method of claim 11 further comprising:
decoding, by the processing assembly, an another indicia in an intermediate image frame of the plurality of image frames to generate decoded indicia data of the another indicia, wherein the intermediate image frame is a predetermined number of image frames or a predetermined time interval after the initial image frame;
determining, by the processing assembly, a third location associated with the another indicia in the intermediate image frame, wherein the third location corresponds to a set of coordinates in the image data;
determining, by the processing assembly, a fourth location associated with the another indicia in an ensuing image frame, wherein the fourth location corresponds to another set of coordinates in the image data and wherein the ensuing image frame is a predetermined number of image frames or a predetermined time interval after the intermediate image frame; and
transmitting, by the processing assembly to the host processor, the decoded indicia data of the another indicia for analysis of the decoded indicia data of the another indicia based upon at least one of the third location or the fourth location.

* * * * *